(12) United States Patent
Imanishi et al.

(10) Patent No.: US 9,927,660 B2
(45) Date of Patent: Mar. 27, 2018

(54) LIQUID CRYSTAL DISPLAY DEVICE AND MANUFACTURING METHOD THEREOF

(71) Applicant: Japan Display Inc., Tokyo (JP)

(72) Inventors: Yasuo Imanishi, Tokyo (JP); Yosuke Hyodo, Tokyo (JP); Chikae Matsui, Tokyo (JP); Hidehiro Sonoda, Tokyo (JP); Noboru Kunimatsu, Tokyo (JP)

(73) Assignee: Japan Display Inc., Tokyo (JP)

( * ) Notice: Subject to any disclaimer, the term of this patent is extended or adjusted under 35 U.S.C. 154(b) by 395 days.

(21) Appl. No.: 14/287,353

(22) Filed: May 27, 2014

(65) Prior Publication Data

US 2014/0347585 A1    Nov. 27, 2014

(30) Foreign Application Priority Data

May 27, 2013 (JP) ................................ 2013-111016

(51) Int. Cl.
*G02F 1/1337* (2006.01)
*G02F 1/1343* (2006.01)
*C08G 73/10* (2006.01)

(52) U.S. Cl.
CPC .. *G02F 1/133788* (2013.01); *G02F 1/133723* (2013.01); *G02F 1/134363* (2013.01);
(Continued)

(58) Field of Classification Search
CPC ......... G02F 1/133788; G02F 1/133723; G02F 1/134363; G02F 1/13378; Y10T 428/1023;
(Continued)

(56) References Cited

U.S. PATENT DOCUMENTS 5,666,178 A * 9/1997 Hirata ............... G02F 1/133788
349/136
2006/0061719 A1   3/2006 Tomioka et al.
(Continued)

FOREIGN PATENT DOCUMENTS

JP       H7-64097 A       3/1995
JP       2003-107486 A    4/2003
(Continued)

OTHER PUBLICATIONS

Il'yasov et al., Imidization of polyamide acid by laser radiation, 1975, American Institute of Physics, vol. 4, No. 10, pp. 1287-1288.*
(Continued)

*Primary Examiner* — Eli D Strah
(74) *Attorney, Agent, or Firm* — Typha IP LLC

(57) ABSTRACT

The present invention provides a liquid crystal display device in which even in the case of using a photo-alignment technique, excellent afterimage characteristics can be stably obtained.

Provided is a liquid crystal display device including a TFT substrate having an alignment film, an opposed substrate which is arranged to face the TFT substrate and on which an alignment film is formed, and a liquid crystal layer sandwiched between the alignment films, wherein the alignment films are materials that can provide a liquid crystal alignment restraining force by irradiating polarized light, and the ratio of oxygen atoms on the surface of the alignment film is higher than that in the alignment film.

10 Claims, 8 Drawing Sheets

(52) U.S. Cl.
CPC ........ *B32B 2457/202* (2013.01); *C08G 73/10* (2013.01); *C08G 73/105* (2013.01); *C08G 73/1046* (2013.01); *C08G 73/1078* (2013.01); *G02F 1/13378* (2013.01); *Y10T 428/1005* (2015.01); *Y10T 428/1018* (2015.01); *Y10T 428/1023* (2015.01)

(58) Field of Classification Search
CPC ......... Y10T 428/1018; Y10T 428/1005; B32B 2457/202; C08G 73/10; C08G 73/1046; C08G 73/105; C08G 73/1078
See application file for complete search history.

(56) References Cited

U.S. PATENT DOCUMENTS

2011/0157531 A1* 6/2011 Suwa ................ G02F 1/133788
349/124

2011/0199565 A1* 8/2011 Kunimatsu ....... G02F 1/133723
349/123
2011/0222006 A1* 9/2011 Imanishi ............... G02F 1/1337
349/124

FOREIGN PATENT DOCUMENTS

| JP | 2004-206091 A | | 7/2004 | |
|----|---------------|---|--------|---|
| JP | 2005213310 A | * | 8/2005 | ................ C08J 7/00 |
| JP | 2011-95696 A | | 5/2011 | |
| JP | 2011-170031 A | | 9/2011 | |

OTHER PUBLICATIONS

Masaki Hasegawa et al., Nematic Homogeneous Alignment by Photo Depolymerization of Polymide. 2G604, Japanese Liquid Crystal Society, IBM Research, Tokyo Research Laboratory.
Japanese Office Action dated Mar. 21, 2017 for corresponding Japanese Application No. 2013-111016.

* cited by examiner

LIQUID CRYSTAL DISPLAY DEVICE AND MANUFACTURING METHOD THEREOF

CLAIM OF PRIORITY

The present application claims priority from Japanese patent application JP 2013-111016 filed on May 27, 2013 the content of which is hereby incorporated by reference into this application.

BACKGROUND OF THE INVENTION

1. Field of the Invention

The present invention relates to a liquid crystal display device and a manufacturing method thereof.

2. Description of the Related Art

A liquid crystal display device has been widely used in various fields because of the features such as high display quality, a small thickness, a light weight, and low power consumption, and thus has been widely used for monitors for mobile devices such as those for mobile phones and digital still cameras, monitors for desktop personal computers, monitors for printing and designing, monitors for medical use, and liquid crystal televisions. Along with the expansion in application, higher image quality and higher quality have been required for the liquid crystal display device. In particular, high brightness by high transmittance and low power consumption have been strongly required. Further, along with the popularization of the liquid crystal display device, there has been a strong need for low costs.

In general, a liquid crystal display device displays an image using changes of the optical characteristics of a liquid crystal layer caused by changing the alignment direction of liquid crystal molecules while applying an electric field to the liquid crystal molecules of the liquid crystal layer sandwiched between a pair of substrates. The alignment direction of the liquid crystal molecules when no electric field is applied is regulated by an alignment film obtained by performing a rubbing process on the surface of a polyimide thin film. A conventional active driving-method liquid crystal display device having a switching element such as a thin-film transistor (TFT) for each pixel displays an image in such a manner that an electrode is provided at each of a pair of substrates sandwiching a liquid crystal layer to be set as a so-called vertical electric field in which the direction of an electric field applied to the liquid crystal layer becomes substantially vertical to the surface of the substrate, and the optical rotation of liquid crystal molecules configuring the liquid crystal layer are used. As typical vertical electric-field liquid crystal display devices, a TN (Twisted Nematic) method and a VA (Vertical Alignment) method are known.

In the TN or VA liquid crystal display device, the viewing angle is disadvantageously narrow. Accordingly, an IPS (In-Plane Switching) method and an FFS (Fringe-Field Switching) method are known as display methods to achieve a wide viewing angle. The IPS method and the FFS method are so-called horizontal electric-field display methods in which a comb-like electrode is formed at one of a pair of substrates, and an electric field generated has components substantially parallel to the surface of the substrate. Liquid crystal molecules configuring a liquid crystal layer are allowed to be rotated in a plane substantially parallel to the substrate, and the birefringence of the liquid crystal layer is used to display an image. Due to the in-plane switching of the liquid crystal molecules, the viewing angle is advantageously wider and the load capacity is lower as compared to the conventional TN method. Thus, these methods have been highly expected as new liquid crystal display devices in place of the TN method, and have been rapidly progressed in these days.

A liquid crystal display element controls the alignment state of the liquid crystal molecules in the liquid crystal layer on the basis of the presence or absence of electric fields. Specifically, upper and lower polarizing plates provided outside the liquid crystal layer are placed to be completely orthogonal to each other, and a phase difference is allowed to be generated using the alignment state of intermediate liquid crystal molecules to form bright and dark states. The alignment state when no electric field is applied to liquid crystal can be controlled in such a manner that a polymer thin film called "alignment film" is formed on the surface of a substrate, and the liquid crystal molecules are aligned in the polymer array direction using an intermolecular mutual effect by the van der Waals force of polymer chains and liquid crystal molecules at the interface. The effect is called as providing an alignment restraining force or a liquid crystal alignment capability, or an alignment process.

Polyimide is used for the alignment film of a liquid crystal display in many cases. As a formation method, polyamide acid as the precursor of polyimide is dissolved in various solvents to be applied onto a substrate by spin coating or printing. Then, the substrate is heated at a temperature of 200° C. or higher to remove the solvents, and polyamide acid is put to imidization ring-closing reaction to polyimide. The film thickness at this time is as thin as about 100 nm. The surface of the polyimide thin film is rubbed in a certain direction using a rubbing cloth, so that the polyimide polymer chains on the surface are aligned in the direction to realize a state in which the anisotropy of polymer on the surface is high. However, there are problems such as generation of static electricity and foreign substances caused by rubbing and unevenness of rubbing due to irregularities of the surface of the substrate. Thus, a photo-alignment method that is not required to be contacted with the rubbing cloth and that controls the molecular alignment using polarized light is beginning to be employed.

The photo-alignment methods of the liquid crystal alignment film include a photoisomerization type in which polarized ultraviolet rays such as azo color are irradiated to change the geometric arrangement in molecules, and an optical dimeric type in which molecular frameworks such as cinnamic acid, coumalin, and chalcone are chemically bonded by polarized ultraviolet rays. However, a photodegradative type in which polarized ultraviolet rays are irradiated onto polymer to cut and decompose only the polymer chains aligned in the direction, and the polymer chains in the direction orthogonal to the polarized direction are left is suitable for photo-alignment of polyimide that is reliable and proven as the liquid crystal alignment film.

The principle of such a photo-alignment method is disclosed in, for example, "Nematic Homogeneous Alignment by Photo Depolymerization of Polyimide, by Masaki HASEGAWA and Yoichi TAIRA, proceedings of 20th discussion on liquid crystal, pp. 232 to 233, 1994". The method was studied using various liquid crystal display methods, among which the IPS method is disclosed in Japanese Patent Application Laid-Open No. 2004-206091 as a liquid crystal display device that reduces generation of display fault due to variation of the initial alignment direction, has stable alignment of liquid crystal, is suitable for mass production, and has high-quality images in which the contrast ratio is increased. Japanese Patent Application Laid-Open No. 2004-206091 shows that alignment control capability is provided by an alignment process in which at least one of secondary processes of heating, irradiation of infrared rays, irradiation of far-infrared rays, irradiation of electron beams, and irradiation of radioactive rays is performed for polyamic acid or polyimide composed of cyclobutanetetracarboxylic dianhydride and/or the derivative thereof and aromatic diamine.

Then, Japanese Patent Application Laid-Open No. 2004-206091 shows that especially, at least one of processes of heating, irradiation of infrared rays, irradiation of far-infrared rays, irradiation of electron beams, and irradiation of radioactive rays is performed together with a polarization irradiation process, so that the alignment process can be further effectively performed. Further, Japanese Patent Application Laid-Open No. 2004-206091 shows that an imidization baking process of an alignment control film is performed together with a polarization irradiation process, so that the alignment process can be further effectively performed. In particular, in the case where at least one of processes of heating, irradiation of infrared rays, irradiation of far-infrared rays, irradiation of electron beams, and irradiation of radioactive rays is performed for the liquid crystal alignment film in addition to the polarization irradiation process, the temperature of the alignment control film is desirably in a range of 100° C. to 400° C. More desirably, the temperature is in a range of 150° C. to 300° C. Japanese Patent Application Laid-Open No. 2004-206091 shows that the processes of heating, irradiation of infrared rays, and irradiation of far-infrared rays are effective because the processes can be performed together with the imidization baking process of the alignment control film.

However, the history of development of the liquid crystal display device using the photo-alignment film is shorter as compared to that using the rubbing alignment film, and there are not sufficient findings in terms of long-time display quality over several years as a practical liquid crystal display device. Specifically, the fact is that a relation between image fault that does not become obvious in the initial stage of manufacturing and a problem unique to the photo-alignment film has been hardly reported.

SUMMARY OF THE INVENTION

The inventors concluded that a photo-alignment technique would become important in order to realize high-quality and high-definition liquid crystal display devices in the future, and studied, in detail, issues of applying the photo-alignment technique to the liquid crystal display devices. As a result, it was found that the photo-alignment technique is effective for the problems of generation of static electricity and foreign substances and unevenness due to irregularities of the surface of the substrate as compared to the rubbing technique. However, it was found that the photo-alignment technique is disadvantageous when adapted to products in the future in terms of afterimage characteristics.

An object of the present invention is to provide a liquid crystal display device and a manufacturing method thereof in which even in the case of using a photo-alignment technique, excellent afterimage characteristics can be stably obtained.

The following is a summary of the representative embodiment of the invention disclosed in the application.

The present invention provides a liquid crystal display device including: a TFT substrate which includes pixel electrodes and TFTs and on which an alignment film is formed on a pixel; and an opposed substrate which is arranged to face the TFT substrate and on which an alignment film is formed on the uppermost surface on the side of the TFT substrate, wherein liquid crystal is sandwiched between the alignment film of the TFT substrate and that of the opposed substrate, the alignment film is a hydrophobic material that can provide a liquid crystal alignment restraining force by irradiating polarized light, a layer in which the ratio of elements configuring the alignment film is changed towards the film thickness direction is provided on the surface of the alignment film, and the ratio of oxygen atoms on the surface of the alignment film is higher than that inside the alignment film in a state where hydrophobicity is maintained.

Further, in the liquid crystal display device, the ratio of oxygen configuring the alignment film of the layer in which the ratio of elements configuring the alignment film is changed towards the film thickness direction is gradually decreased from the surface of the alignment film towards the inside of the alignment film.

Further, in the liquid crystal display device, the ratio of oxygen at a position with the highest oxygen concentration in the layer in which the ratio of elements is changed towards the film thickness direction is higher than that at a position with the lowest oxygen concentration by 25% or higher.

Further, in the liquid crystal display device, the thickness of the layer in which the ratio of elements is changed towards the film thickness direction is smaller than the entire thickness of the alignment film by 50% or smaller.

Further, in the liquid crystal display device, the root-mean-square of the size of irregularities on the surface of the alignment film is 1 nm or smaller.

Further, in the liquid crystal display device, the alignment film is a photodegradation-type photo-alignment film.

Further, in the liquid crystal display device, the alignment film is a photodegradation-type photo-alignment film including polyimide of (Chemical formula 1) in which the inside of the parentheses [ ] represents a chemical structure of a repeating unit, the index n represents a number of a repeating unit, N represents nitrogen atoms, O represents oxygen atoms, A represents a quadrivalent organic group including a cyclobutane ring, and D represents a divalent organic group.

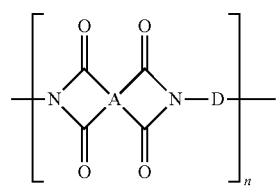

[Chemical formula 1]

Further, in the liquid crystal display device, the alignment film has a structure in which two kinds of layers are laminated, and is of a two-layer structure including a photo-alignment upper layer capable of photo-alignment and a low-resistive lower layer that is smaller in resistivity than the photo-alignment upper layer.

Further, in the liquid crystal display device, the liquid crystal display device is an IPS liquid crystal display device.

The layer in which the ratio of elements configuring the alignment film is changed towards the film thickness direction means a layer in which when analyzing the elemental composition of the alignment film, the composition in the plane of the film is constant, but when analyzing the composition in the plane in the film thickness direction, the elemental composition is changed. The present invention is characteristic in using the alignment film including such a layer. The state in which the ratio of oxygen configuring the alignment film is gradually decreased from the surface of the alignment film towards the inside of the alignment film means a state in which when analyzing the composition in the plane in the film thickness direction, the composition of oxygen is decreased without increasing in the middle as the position from the surface of the film becomes deeper.

Further, polyimide in this case is a highly-polymerized compound represented by (Chemical formula 1) in which the inside of the parentheses [ ] represents a chemical structure of a repeating unit, the index n represents a number of a repeating unit, N represents nitrogen atoms, O represents oxygen atoms, A represents a quadrivalent organic group, and D represents a divalent organic group. As an example, the structure of A includes an aromatic ring system compound such as a phenylene ring, a naphthalene ring, or an anthracene ring, an aliphatic ring system compound such as cyclobutane, cyclopentane, or cyclohexane, or a compound obtained by bonding a substituent to these compounds. Further, as an example, the structure of D includes an aromatic ring system compound such as phenylene, biphenylene, oxyphenylene, biphenylene amine, naphthalene, or anthracene, an aliphatic ring system compound such as cyclohexane or bicyclohexane, or a compound obtained by bonding a substituent to these compounds.

Polyimide is applied onto an underlayer held in a substrate in the state of the precursor of polyimide.

Further, the precursor of polyimide in this case is polyamide acid or a polyamide acid ester highly-polymerized compound represented by (Chemical formula 2). In this case, H represents hydrogen atoms, R1 and R2 represent hydrogen or alkyl chains of $-C_mH_{2m+1}$, and m is 1 or 2.

[Chemical formula 2]

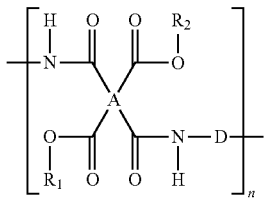

Such an alignment film can be formed by a general formation method of a polyimide alignment film as follows. For example, an underlayer is cleaned using various surface processing methods such as a UV/ozone method, an excimer UV method, and an oxygen plasma method. Then, the precursor of the alignment film is applied using various printing methods such as screen printing, flexographic printing, and ink-jet printing, and a leveling process is performed to have a uniform film thickness under a predetermined condition. Then, for example, the film is heated at a temperature of 180° C. or higher, and polyamide as the precursor is put to imidation reaction to polyimide, so that a thin film can be formed. Further, polarized ultraviolet rays are irradiated and a proper post-process is performed using desired means, so that an alignment restraining force can be generated on the surface of the polyimide alignment film. The upper and lower substrates with the alignment films thus formed are pasted together while keeping a certain gap. Then, a portion in the gap is filled with liquid crystal, and an end portion of the substrate is sealed, so that a liquid crystal panel is completed. Then, optical films such as a polarizing plate and a retardation film are pasted to the panel, and a driving circuit, a backlight, and the like are attached, so that the liquid crystal display device can be obtained.

Further, the present invention provides a manufacturing method of a liquid crystal display device including: a TFT substrate which includes pixel electrodes and TFTs and on which an alignment film is formed on a pixel; and an opposed substrate which is arranged to face the TFT substrate and on which an alignment film is formed on the uppermost surface on the side of the TFT substrate, wherein liquid crystal is sandwiched between the alignment film of the TFT substrate and that of the opposed substrate, the method including the steps of: preparing the TFT substrate including the pixel electrodes and the TFTs; forming the hydrophobic alignment film on the TFT substrate; and increasing the ratio of oxygen atoms on the surface of the alignment film in a state where hydrophobicity is maintained while generating an alignment restraining force on the alignment film by irradiating ultraviolet rays onto the alignment film and by performing an oxidation process for the alignment film.

Further, the present invention provides a manufacturing method of a liquid crystal display device including: a TFT substrate which includes pixel electrodes and TFTs and on which an alignment film is formed on a pixel; and an opposed substrate which is arranged to face the TFT substrate and on which an alignment film is formed on the uppermost surface on the side of the TFT substrate, wherein liquid crystal is sandwiched between the alignment film of the TFT substrate and that of the opposed substrate, the method including the steps of: preparing the opposed substrate; forming the hydrophobic alignment film on the opposed substrate; and increasing the ratio of oxygen atoms on the surface of the alignment film in a state where hydrophobicity is maintained while generating an alignment restraining force on the alignment film by irradiating ultraviolet rays onto the alignment film and by performing an oxidation process for the alignment film.

The following is a summary of effects obtained by the representative embodiment of the invention disclosed in the application.

Even in the case of using a photo-alignment technique, the ratio of oxygen atoms on the surface of an alignment film is increased while hydrophobicity on the surface of the alignment film is maintained, so that it is possible to obtain a liquid crystal display device and a manufacturing method thereof in which excellent afterimage characteristics can be stably obtained while preventing absorption of contaminated objects on the alignment surface and accumulation of residual electric charge without deteriorating alignment characteristics.

BRIEF DESCRIPTION OF THE DRAWINGS

FIGS. 2A to 2C are schematic views of changes in the ratio of oxygen atoms from the surface of the alignment film to the depth direction in the liquid crystal display device according to the embodiment of the present invention, in which FIG. 2A shows a case in which the ratio of oxygen atoms is decreased from the surface to the inside, and then is increased more than the ratio of oxygen atoms contained in an inner layer, FIG. 2B shows a case in which the ratio of oxygen atoms is decreased from the surface to the inside, and then becomes substantially the same as the ratio of oxygen atoms contained in the inner layer, and FIG. 2C shows a case in which the ratio of oxygen atoms is decreased from the surface to the inside, and then is decreased less than the ratio of oxygen atoms contained in the inner layer;

DETAILED DESCRIPTION OF THE INVENTION

Figure 1:
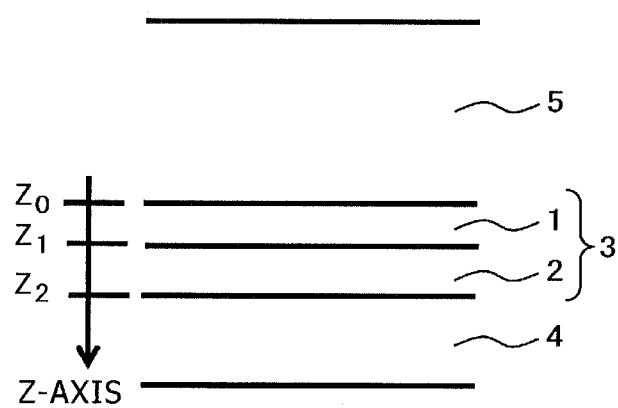
FIG. 1 is a schematic view of a structure of an alignment film in a liquid crystal display device according to an embodiment of the present invention.

Hereinafter, the present invention will be described in detail with reference to the drawings. It should be noted that constitutional elements having the same functions are given the same reference numerals in the all drawings for explaining an embodiment, and the explanation thereof will not be repeated.

FIG. 1 shows an outline view of a basic configuration of an alignment film in a liquid crystal display device according to an embodiment of the present invention. In the liquid crystal display device, an alignment film 3 is formed on an underlayer 4, and a liquid crystal layer 5 is formed on the alignment film. Although not especially illustrated, an opposed substrate in which an alignment film having the same configuration is formed is combined therewith. A layer 1 in which the ratio of elements is changed towards the film thickness direction is formed on the surface of the alignment film 3 on the side of the liquid crystal layer, and another layer 2 is formed under the layer 1. In this case, the film thickness direction is assumed as the z-direction, the uppermost position of the alignment film in contact with the liquid crystal layer is assumed as $z_0$, the lowermost position of the layer 1 in which the ratio of elements is changed towards the film thickness direction is assumed as $z_1$, and the lower end of the layer 2 thereunder is assumed as $z_2$.

Figure 2A:
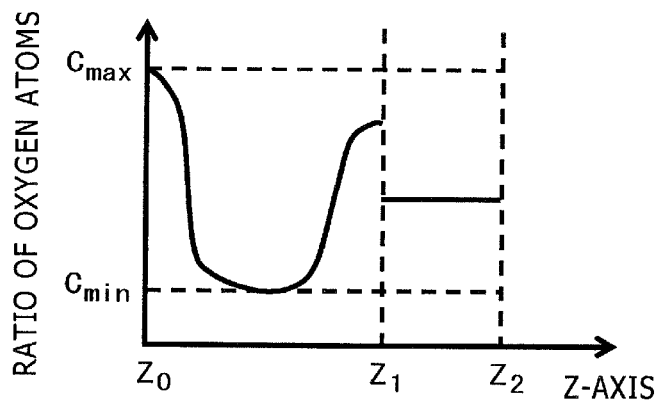
Figure 2B:
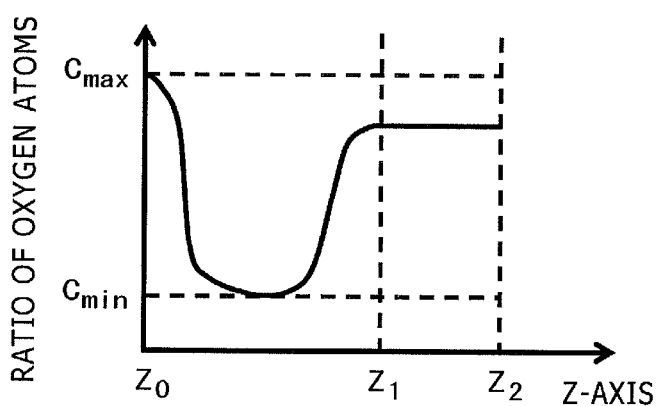
Figure 2C:
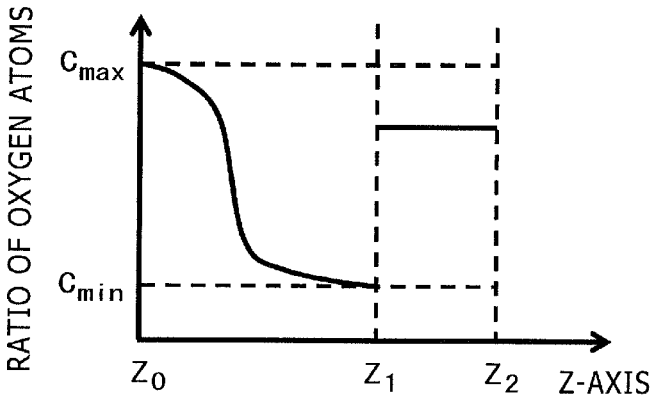

Each of FIG. 2 schematically shows a state in which the ratio of oxygen O atoms among the elements of the alignment film is changed towards the film thickness direction in the liquid crystal display device shown in FIG. 1. The range from $z_0$ to $z_1$ corresponds to the layer 1. Each of FIG. 2A and FIG. 2B shows a case in which the ratio is decreased from the surface of the film and is increased later, and FIG. 2C shows a case in which the ratio is moderately decreased. As a difference between FIG. 2A and FIG. 2B, FIG. 2A shows a case in which the ratio of oxygen atoms of the layer 2 is lower than that at the lower end of the layer 1, and FIG. 2B shows a case in which the both ratios are the same. As described above, the elemental composition in the layer 1 can be changed in a complicated manner. However, in order to obtain excellent afterimage characteristics as will be described later, it is necessary to increase the ratio of oxygen atoms on the surface of the alignment film while maintaining the hydrophobic state of the surface of the alignment film. A maximum value $C_{max}$ and a minimum value $C_{min}$ of the ratio of oxygen atoms in the layer thickness direction are parameters to characterize the layer 1, and the ratio desirably becomes $C_{max}$ when $z=z_0$. It should be noted that some element has the alignment film formed using only a layer in which the elemental composition is changed without providing the layer 2. In this case, as a general configuration, a two-layered structure as shown in FIG. 1 is illustrated.

Such changes in the elemental composition can be analyzed using various thin-film surface analyses, such as X-ray photoemission spectroscopy (XPS), Auger electron spectroscopy, and a time-of-flight secondary ion mass spectrometry device (TOF-SIMS). First, a liquid crystal panel of a target liquid crystal display device is decomposed. Then, the liquid crystal is washed in an alkane solvent such as cyclohexane, and is dried to be used as a specimen for various analyses. Especially, in order to analyze in the depth direction of the film thickness direction, the specimen can be evaluated by various analyses while being sputtered using gas ions such as Ar.

In order to increase the ratio of oxygen atoms on the surface of the alignment film, the film can be produced in accordance with the following procedure. Specifically, the precursor of polyimide capable of photo-alignment is applied onto an underlayer to form a polyimide thin film by heating, and polarized ultraviolet rays are irradiated on the surface of the thin film, so that an alignment restraining force is applied. Before, during, or after the irradiation of the polarized ultraviolet rays, the surface of the thin film is exposed to an oxidation atmosphere, and thus a layer having a high ratio of oxygen atoms from the surface of the thin film to the inside can be formed. As a method of oxidation process, ozone gas from the air by a source of ultraviolet rays and various oxidizing agents (hydrogen peroxide water, hypochlorous water, ozone water, hypoiodous acid water, permanganic acid water, and the like) are used. In this case, the distribution in which the ratio of oxygen atoms is changed from the surface of the thin film to the inside differs depending on the oxidation atmosphere to be used or the exposure conditions. Further, in addition to the irradiation of the polarized ultraviolet rays and the exposure to the oxidation atmosphere, drying by heating or irradiation of light having a different wavelength including infrared rays can be performed before, after, or during these processes. Alternatively, various solvent processes including water to remove foreign substances on the surface can be performed before or after these processes. The layer having the increased ratio of oxygen atoms is desirably formed on the surface of the photo-alignment film so as not to decrease the liquid crystal alignment restraining force by the photo-alignment process. Specifically, the ratio of the layer to be formed is desirably half or smaller the film thickness from the surface, in contact with the liquid crystal, of the alignment film layer capable of photo-alignment. More desirably, the ratio is one tenth or smaller of the film thickness. Forming the layer having the increased and limited ratio of oxygen atoms on the surface of the photo-alignment film can suppress harmful effects due to excessive oxidation on the surface of the alignment film caused by further increasing the ratio of oxygen atoms. For example, the following harmful effects can be suppressed: the surface of the alignment film is changed to hydrophilicity to decrease the contact angle relative to water by 20 degrees or more and the mutual action between the alignment film and liquid crystal molecules is changed. On the other hand, although the expression mechanism has not been clarified yet, the characteristics of retaining the liquid crystal alignment restraining force can be improved by photo-alignment. For example, even though the same liquid crystal alignment restraining force is held immediately after the formation of the liquid crystal display device, the liquid crystal layer is continued to be aligned for a long time by an electric field in a direction different from the liquid crystal alignment direction in which the liquid crystal alignment restraining force is induced, and the afterimage time until being returned to the initial alignment direction after the electric field is removed can be shortened.

Further, when producing the alignment film, the composition can be adjusted in such a manner that two or more types of alignment films are overlapped with each other to be applied and imidized, or two or more types of polyimide precursors are blended to be applied and imidized.

The alignment films obtained after completion of such processes can be assembled to the liquid crystal display device by a general method.

Figure 3A:
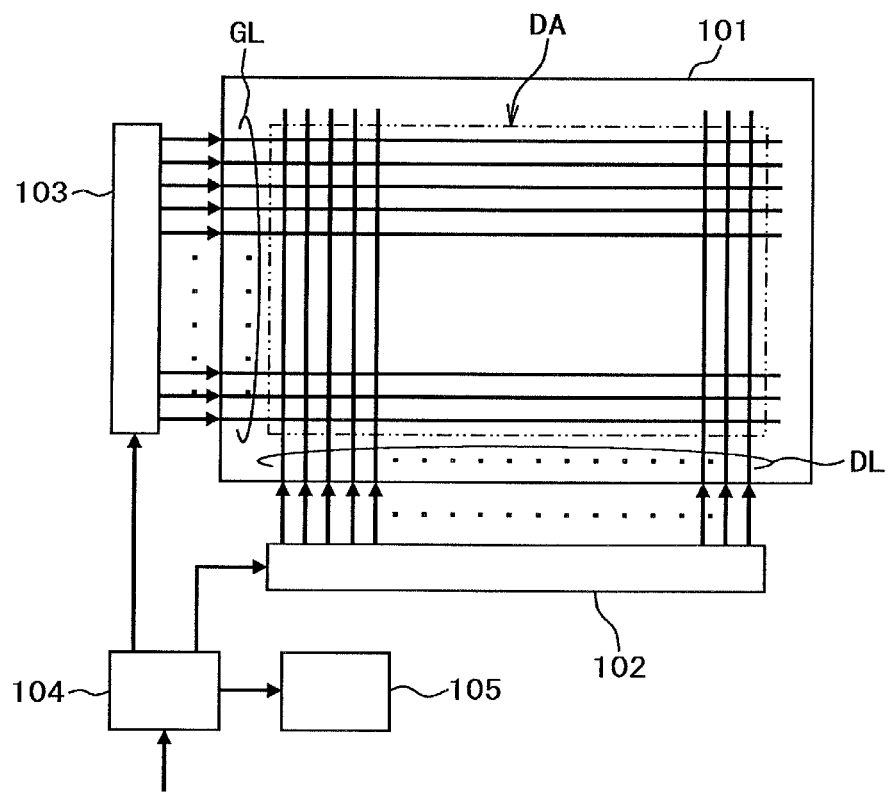
FIG. 3A is a schematic block diagram for showing an example of an outline configuration of the liquid crystal display device according to the embodiment of the present invention.
Figure 3B:
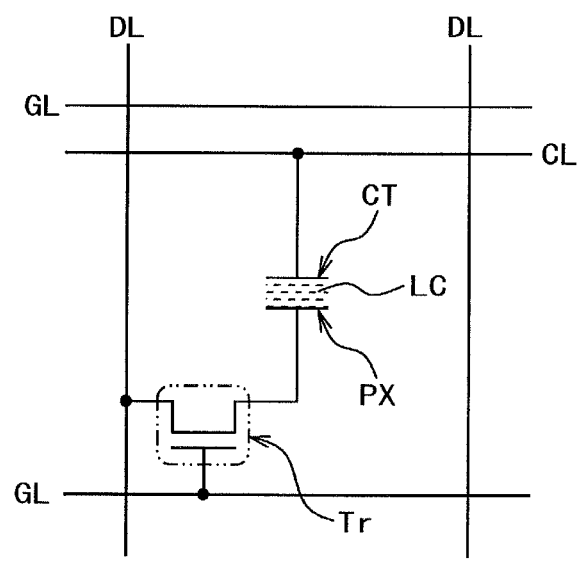
FIG. 3B is a schematic circuit diagram for showing an example of a circuit configuration of one pixel of a liquid crystal display panel shown in FIG. 3A.
Figure 3C:
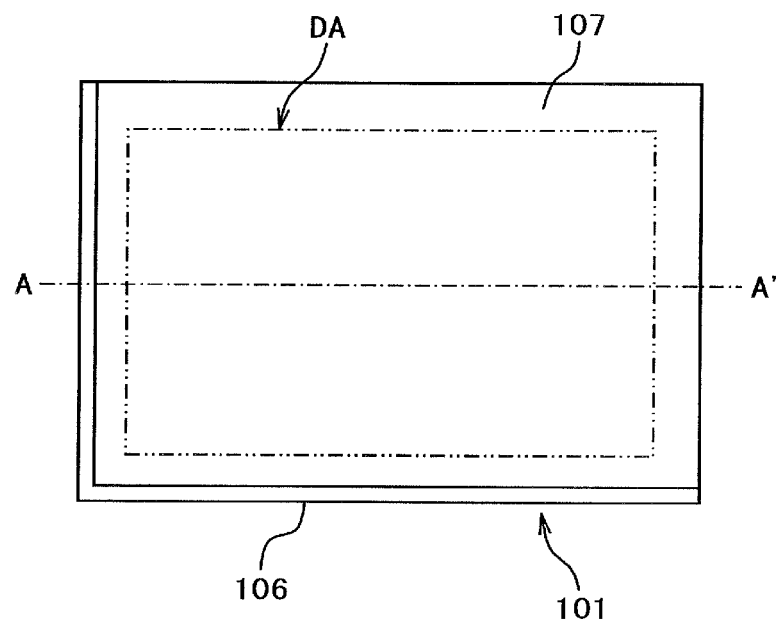
FIG. 3C is a schematic plan view for showing an example of an outline configuration of the liquid crystal display panel shown in FIG. 3A.
Figure 3D:
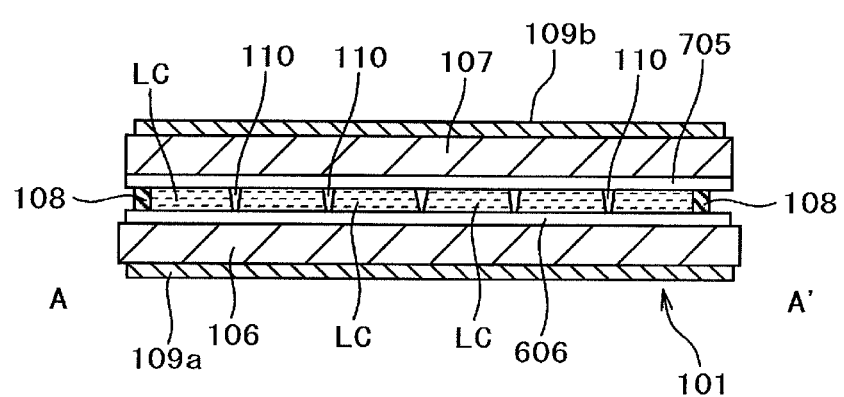
FIG. 3D is a schematic cross-sectional view for showing an example of a cross-sectional configuration taken along the line A-A' shown in FIG. 3C.

Next, the liquid crystal display device in which the alignment films are produced will be described. Each of FIG. 3A to FIG. 3D is a schematic view for showing an example of an outline configuration of the liquid crystal display device according to the embodiment of the present invention. FIG. 3A is a schematic block diagram for showing an example of an outline configuration of the liquid crystal display device. FIG. 3B is a schematic circuit diagram for showing an example of a circuit configuration of one pixel in the liquid crystal display panel. FIG. 3C is a schematic plan view for showing an example of an outline configuration of the liquid crystal display panel. FIG. 3D is a schematic cross-sectional view for showing an example of a cross-sectional configuration taken along the line A-A' of FIG. 3C.

The alignment film in which the hydrophobic state is maintained and on the surface of which the ratio of oxygen atoms is increased is applied to, for example, an active matrix-type liquid crystal display device. The active matrix-type liquid crystal display device is used for, for example, a display (monitor) for a portable electronic device, a display for a personal computer, a display for printing or designing, a display for a medical device, or a liquid crystal television.

For example, as shown in FIG. 3A, the active matrix-type liquid crystal display device includes a liquid crystal display panel 101, a first driving circuit 102, a second driving circuit 103, a control circuit 104, and a backlight 105.

The liquid crystal display panel 101 has plural scanning signal lines GL (gate lines) and plural video signal lines DL (drain lines). The video signal lines DL are connected to the first driving circuit 102, and the scanning signal lines GL are connected to the second driving circuit 103. It should be noted that FIG. 3A shows some of the plural scanning signal lines GL, and more scanning signal lines GL are densely arranged in the actual liquid crystal display panel 101. As similar to the above, FIG. 3A shows some of the plural video signal lines DL, and more video signal lines DL are densely arranged in the actual liquid crystal display panel 101.

Further, a display area DA of the liquid crystal display panel 101 is configured using a set of plural pixels, and an area occupied by one pixel in the display area DA corresponds to an area surrounded by, for example, adjacent two scanning signal lines GL and adjacent two video signal lines DL. In this case, the circuit of one pixel is configured as shown in, for example, FIG. 3B, and has a TFT element Tr functioning as an active element, a pixel electrode PX, a common electrode CT (occasionally referred to as an opposed electrode), and a liquid crystal layer LC. In this case, the liquid crystal display panel 101 is provided with, for example, common lines CL that share common electrodes CT of plural pixels.

Further, the liquid crystal display panel 101 is structured in such a manner that alignment films 606 and 705 are formed on the surfaces of an active matrix substrate (TFT substrate) 106 and an opposed substrate 107, respectively, and a liquid crystal layer LC (liquid crystal material) is arranged between the alignment films as shown in, for example, FIG. 3C and FIG. 3D. Further, although not especially illustrated, an intermediate layer (for example, an optical intermediate layer such as a retardation film, a color conversion layer, or an optical diffusion layer) may be appropriately provided each between the alignment film 606 and the active matrix substrate 106 and between the alignment film 705 and the opposed substrate 107.

In this case, the active matrix substrate 106 and the opposed substrate 107 are allowed to adhere to each other using a circular seal material 108 provided outside the display area DA, and the liquid crystal layer LC is sealed in a space surrounded by the alignment film 606 on the side of the active matrix substrate 106, the alignment film 705 on the side of the opposed substrate 107, and the seal material 108. In this case, the liquid crystal display panel 101 of the liquid crystal display device having the backlight 105 has a pair of polarizing plates 109a and 109b that are arranged to face each other while sandwiching the active matrix substrate 106, the liquid crystal layer LC, and the opposed substrate 107.

It should be noted that the active matrix substrate 106 is a substrate obtained by arranging the scanning signal lines GL, the video signal lines DL, the active elements (TFT elements Tr), and the pixel electrodes PX on an insulating substrate such as a glass substrate. Further, in the case where the driving method of the liquid crystal display panel 101 is a horizontal electric field driving method such as an IPS method, the common electrodes CT and the common lines CL are arranged on the active matrix substrate 106. Further, in the case where the driving method of the liquid crystal display panel 101 is a vertical electric field driving method such as a TN method or a VA (Vertically Alignment) method, the common electrodes CT are arranged on the opposed substrate 107. In the case of the liquid crystal display panel 101 of the vertical electric field driving method, each of the common electrodes CT is generally a large-area plate electrode shared by all pixels, and no common lines CL are provided.

Further, in the liquid crystal display device according to the embodiment of the present invention, plural columnar spacers 110 are provided in the space in which the liquid crystal layer LC is sealed to equalize, for example, the thickness (referred to as a cell gap in some cases) of the liquid crystal layer LC in each pixel. The plural columnar spacers 110 are provided on, for example, the opposed substrate 107.

The first driving circuit 102 is a driving circuit that generates a video signal (referred to as gradation voltage in some cases) applied to the pixel electrode PX of each pixel through the video signal lines DL and that is generally referred to as a source driver or a data driver. Further, the second driving circuit 103 is a driving circuit that generates a scanning signal applied to the scanning signal lines GL and that is generally referred to as a gate driver or a scanning driver. Further, the control circuit 104 is a circuit that controls the operation of the first driving circuit 102, the operation of the second driving circuit 103, and the brightness of the backlight 105, and is a control circuit generally referred to as a TFT controller or a timing controller. Further, the backlight 105 is, for example, a fluorescent light such as a cold cathode fluorescent light, or a light source such as a light-emitting diode (LED). Light emitted from the backlight 105 is converted into a planar light beam by a reflective plate, a light guide plate, an optical diffusion plate, and a prism sheet (all of which are not shown) to be irradiated onto the liquid crystal display panel 101.

Figure 4:
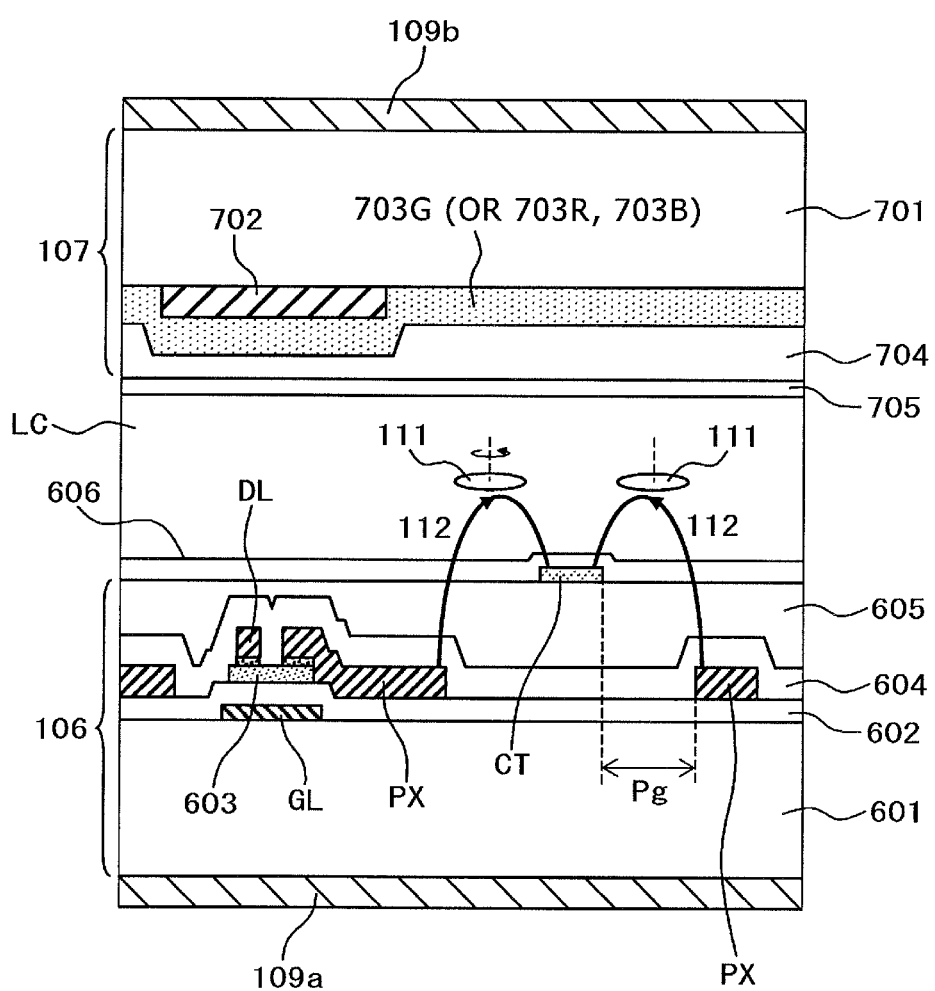
FIG. 4 is a schematic cross-sectional view for showing an example of an outline configuration of main parts (IPS liquid crystal display panel) in the liquid crystal display device according to the embodiment of the present invention.

FIG. 4 is a schematic view for showing an example of an outline configuration of an IPS liquid crystal display panel of the liquid crystal display device according to the embodiment of the present invention. In the active matrix substrate 106, the scanning signal lines GL, the common lines CL (not shown), and a first insulating layer 602 covering the same are formed on the surface of an insulating substrate such as a glass substrate 601. On the first insulating layer 602, formed are a semiconductor layer 603 of the TFT element Tr, the video signal lines DL, the pixel electrodes PX, and a second insulating layer 604 covering the same. The semiconductor layer 603 is arranged above the scanning signal lines GL, and a part of the scanning signal lines GL located under the semiconductor layer 603 functions as a gate electrode of the TFT element Tr.

Further, the semiconductor layer 603 is configured in such a manner that, for example, a source diffusion layer and a drain diffusion layer composed of second amorphous silicon that is different in the type or concentration of impurities from first amorphous silicon are laminated on an active layer (channel formation layer) composed of first amorphous silicon. In this case, a part of the video signal lines DL and a part of the pixel electrodes PX are overlapped with the semiconductor layer 603, and the parts overlapped with the semiconductor layer 603 function as a drain electrode and a source electrode of the TFT element Tr.

Incidentally, the source and the drain of the TFT element Tr are switched to each other depending on the relation of bias, namely, the high-low relation between the electric potential of the pixel electrodes PX and the electric potential of the video signal lines DL when the TFT element Tr is turned on. However, in the following description of the specification, the electrode connected to the video signal lines DL is referred to as a drain electrode, and the electrode connected to the pixel electrodes is referred to as a source electrode. On the second insulating layer 604, formed is a third insulating layer 605 (organic passivation film) with the surface flattened. On the third insulating layer 605, formed are the common electrodes CT and the alignment film 606 covering the common electrodes CT and the third insulating layer 605.

The common electrodes CT are connected to the common lines CL through a contact hole (through-hole) that penetrates the first insulating layer 602, the second insulating layer 604, and the third insulating layer 605. Further, each of the common electrodes CT is formed so that, for example, a gap Pg between the common electrode CT and the pixel electrode PX on a plane is about 7 µm. A polymeric material described in the following examples is applied to the alignment film 606, and a surface process (photo-alignment process) and an oxidation process are performed to provide a liquid crystal alignment capability on the surface, so that the ratio of oxygen atoms on the surface of the alignment film is increased while the hydrophobicity is maintained.

On the other hand, in the opposed substrate 107, a black matrix 702, a color filter (703R, 703G, and 703B), and an overcoat layer 704 covering the same are formed on the surface of the insulating substrate such as the glass substrate 701. The black matrix 702 is, for example, a grid light-blocking film to provide the display area DA with an opening area of each pixel. Further, the color filter (703R, 703G, and 703B) is, for example, a film that allows only light with a specific wavelength area (color) of white light from the backlight 105 to pass through. In the case where the liquid crystal display device is adapted to RGB color display, the color filter 703R that allows red light to pass through, the color filter 703G that allows green light to pass through, and the color filter 703B that allows blue light to pass through are arranged (a pixel of one color is representatively shown in this case).

Further, the surface of the overcoat layer 704 is flattened. On the overcoat layer 704, formed are the plural columnar spacers 110 and the alignment film 705. Each of the columnar spacers 110 is formed in, for example, a conical trapezoidal shape (referred to as a trapezoidal rotator in some cases) with a flat top, and is formed at a position overlapped with a part of the scanning signal lines GL of the active matrix substrate 106 except a part where the TFT element Tr is arranged and a part crossing the video signal lines DL. Further, the alignment film 705 is formed using, for example, polyimide-based resin, and a surface process (photo-alignment process) and an oxidation process are performed to provide a liquid crystal alignment capability on the surface, so that the ratio of oxygen atoms on the surface of the alignment film is increased while the hydrophobicity is maintained.

Further, liquid crystal molecules 111 of the liquid crystal layer LC in the liquid crystal display panel 101 of the system shown in FIG. 4 are aligned substantially in parallel with the surfaces of the glass substrates 601 and 701 when the pixel electrodes PX and the common electrodes CT are the same in electric potential, namely, when no electric field is applied, and are homogeneously aligned towards the initial alignment direction regulated by an alignment restraining force process performed on the alignment films 606 and 705. When the TFT element Tr is turned on and gradation voltage applied to the video signal lines DL is written into the pixel electrodes PX to cause an electric potential difference between the pixel electrodes PX and the common electrodes CT, electric fields 112 (lines of electric force) as shown in the drawing are generated, and the electric fields 112 with an intensity corresponding to the electric potential difference between the pixel electrodes PX and the common electrodes CT are applied to the liquid crystal molecules 111.

In this case, the direction of the liquid crystal molecules 111 configuring the liquid crystal layer LC is changed to the direction of the electric fields 112 due to the mutual action between the dielectric anisotropy of the liquid crystal layer LC and the electric fields 112, and thus the refraction anisotropy of the liquid crystal layer LC is changed. Further, in this case, the direction of the liquid crystal molecules 111 is determined on the basis of the intensity (magnitude of the electric potential difference between the pixel electrodes PX and the common electrodes CT) of the electric fields 112 to be applied. Thus, the liquid crystal display device can display video and images in such a manner that, for example, the electric potential of the common electrodes CT is fixed, and the gradation voltage applied to the pixel electrodes PX is controlled for each pixel to change the light transmittance of each pixel.

Figure 5:
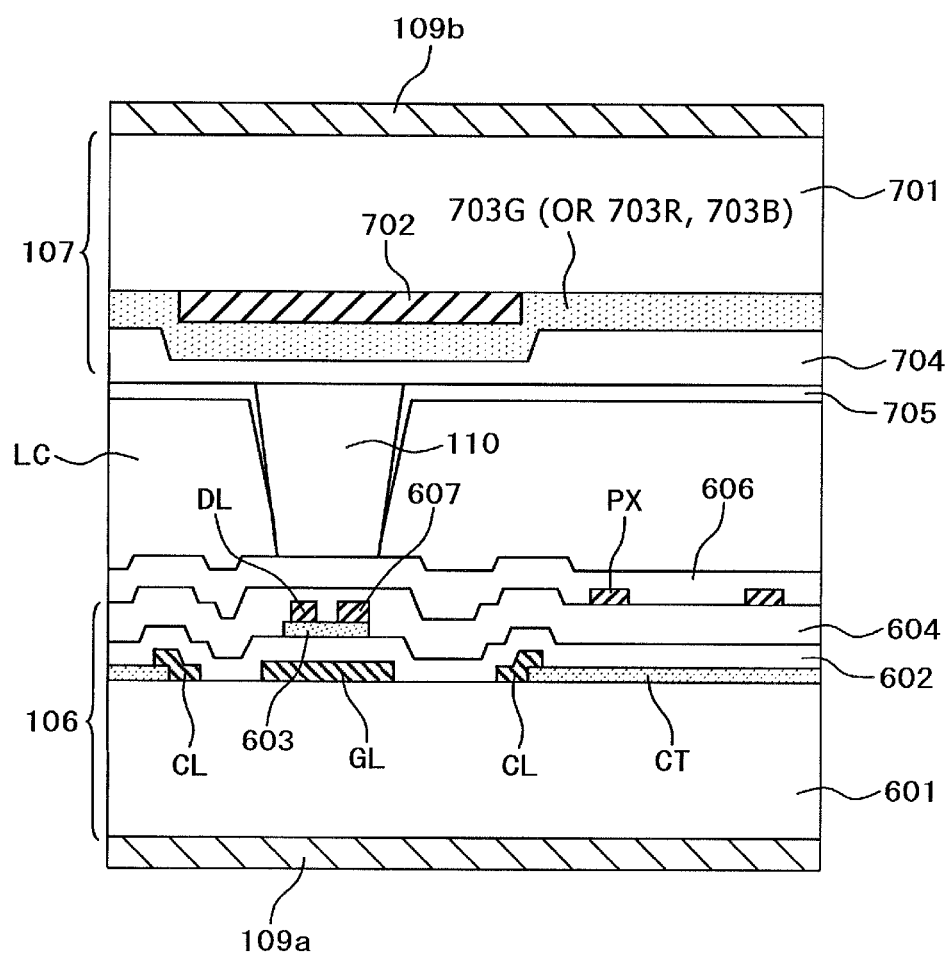
FIG. 5 is a schematic cross-sectional view for showing an example of an outline configuration of main parts (FFS liquid crystal display panel) in the liquid crystal display device according to the embodiment of the present invention.

FIG. 5 is a schematic view for showing an example of an outline configuration of an FFS liquid crystal display panel of another liquid crystal display device according to the embodiment of the present invention. In the active matrix substrate 106, the common electrodes CT, the scanning signal lines GL, the common lines CL, and the first insulating layer 602 covering the same are formed on the surface of the insulating substrate such as the glass substrate 601. On the first insulating layer 602, formed are the semiconductor layer 603 of the TFT element Tr, the video signal lines DL, a source electrode 607, and the second insulating layer 604 covering the same. In this case, a part of the video signal lines DL and a part of the source electrode 607 are overlapped with the semiconductor layer 603, and the parts overlapped with the semiconductor layer 603 function as the drain electrode and the source electrode of the TFT element Tr.

Further, in the liquid crystal display panel 101 of FIG. 5, the third insulating layer 605 is not formed, but the pixel electrodes PX and the alignment film 606 covering the pixel electrodes PX are formed on the second insulating layer 604. Although not shown in the drawing, the pixel electrodes PX are connected to the source electrode 607 through a contact hole (through-hole) that penetrates the second insulating layer 604. In this case, the common electrode CT formed on the surface of the glass substrate 601 is formed in a plate shape at an area (opening area) surrounded by adjacent two scanning signal lines GL and adjacent two video signal lines DL, and the pixel electrode PX having plural slits is laminated on the plate-like common electrode CT. Further, in this case, the common electrodes CT of the pixels arranged in the extension direction of the scanning signal lines GL are shared by the common lines CL. On the other hand, the opposed substrate 107 in the liquid crystal display panel 101 of FIG. 5 has the same configuration as that of the opposed substrate 107 of the liquid crystal display panel 101 of FIG. 3D. Therefore, a detailed explanation related to the configuration of the opposed substrate 107 will be omitted.

Figure 6:
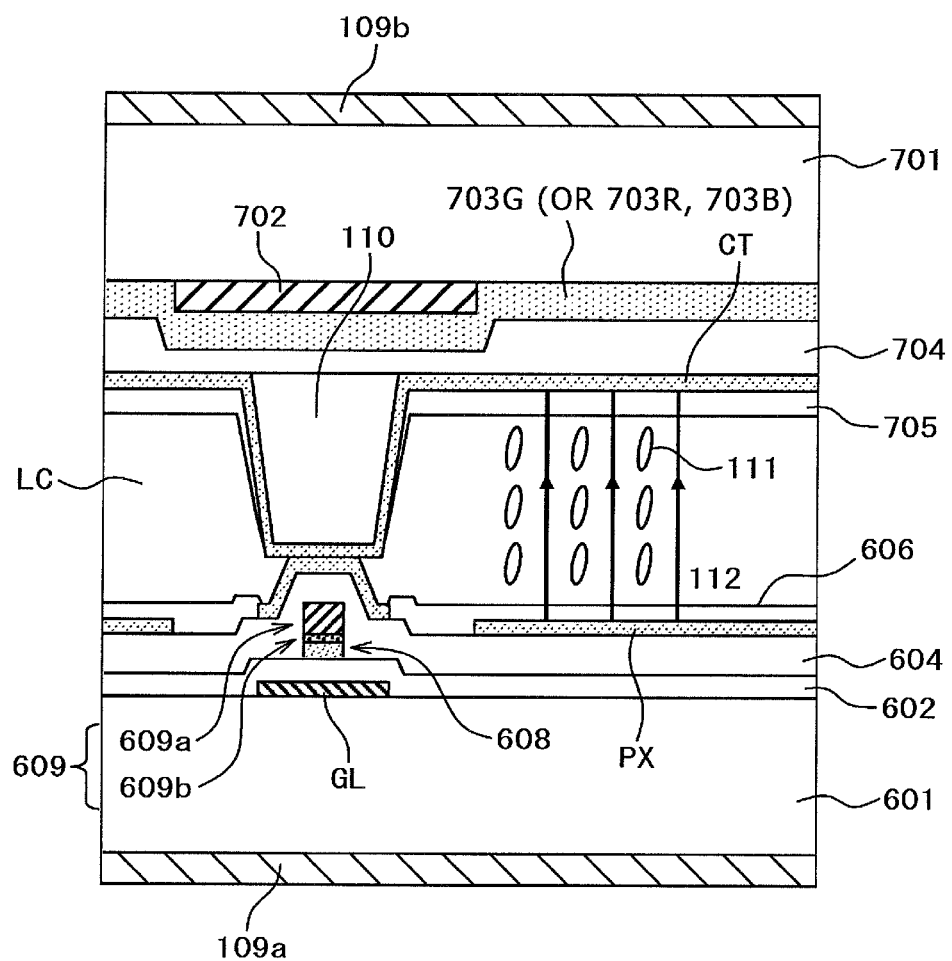
FIG. 6 is a schematic cross-sectional view for showing an example of an outline configuration of main parts (VA liquid crystal display panel) in the liquid crystal display device according to the embodiment of the present invention.

FIG. 6 is a schematic cross-sectional view for showing an example of a cross-sectional configuration of main parts of a VA liquid crystal display panel of another liquid crystal display device according to the embodiment of the present invention. In the liquid crystal display panel 101 of the vertical electric field driving method, for example, the pixel electrodes PX are formed on the active matrix substrate 106, and the common electrodes CT are formed on the opposed substrate 107 as shown in FIG. 6. In the case of the VA liquid crystal display panel 101 as one of the vertical electric field driving methods, for example, the pixel electrodes PX and the common electrodes CT are formed in a flat shape (simple plate shape) using a transparent conductor such as ITO.

In this case, the liquid crystal molecules 111 are arranged vertical to the surfaces of the glass substrates 601 and 701 by the alignment films 606 and 705 when the pixel electrodes PX and the common electrodes CT are the same in electric potential, namely, when no electric field is applied. Then, when an electric potential difference between the pixel electrodes PX and the common electrodes CT is generated, the electric fields 112 (lines of electric force) that are substantially vertical to the glass substrates 601 and 701 are generated, and the liquid crystal molecules 111 lean in the direction parallel to the substrates 601 and 701 to change the polarization state of incident light. In this case, the direction of the liquid crystal molecules 111 is determined on the basis of the intensity of the electric fields 112 to be applied.

Thus, the liquid crystal display device displays video and images in such a manner that, for example, the electric potential of the common electrodes CT is fixed, and the video signal (gradation voltage) applied to the pixel electrodes PX is controlled for each pixel to change the light transmittance of each pixel. Further, as the configuration of the pixel in the VA liquid crystal display panel 101, for example, as the plane shapes of the TFT elements Tr and the pixel electrodes PX, there are various configurations. Thus, the configuration of the pixel in the VA liquid crystal display panel 101 shown in FIG. 6 may be any one of the configurations. In this case, a detailed explanation related to the configuration of the pixel in the liquid crystal display panel 101 will be omitted. It should be noted that the reference numeral 608 denotes a conductive layer, the reference numeral 609 denotes a protrusion formation member, the reference numeral 609a denotes a semiconductor layer, and the reference numeral 609b denotes a conductive layer.

The embodiment of the present invention relates to the liquid crystal display panel 101, especially, a part in contact with the liquid crystal layer LC in the active matrix substrate 106 and the opposed substrate 107 in the above-described active matrix liquid crystal display device and a surrounding configuration. Therefore, detailed explanations for the configurations of the first driving circuit 102, the second driving circuit 103, the control circuit 104, and the backlight 105 to which the conventional technique can be applied as it is will be omitted.

Figure 8:
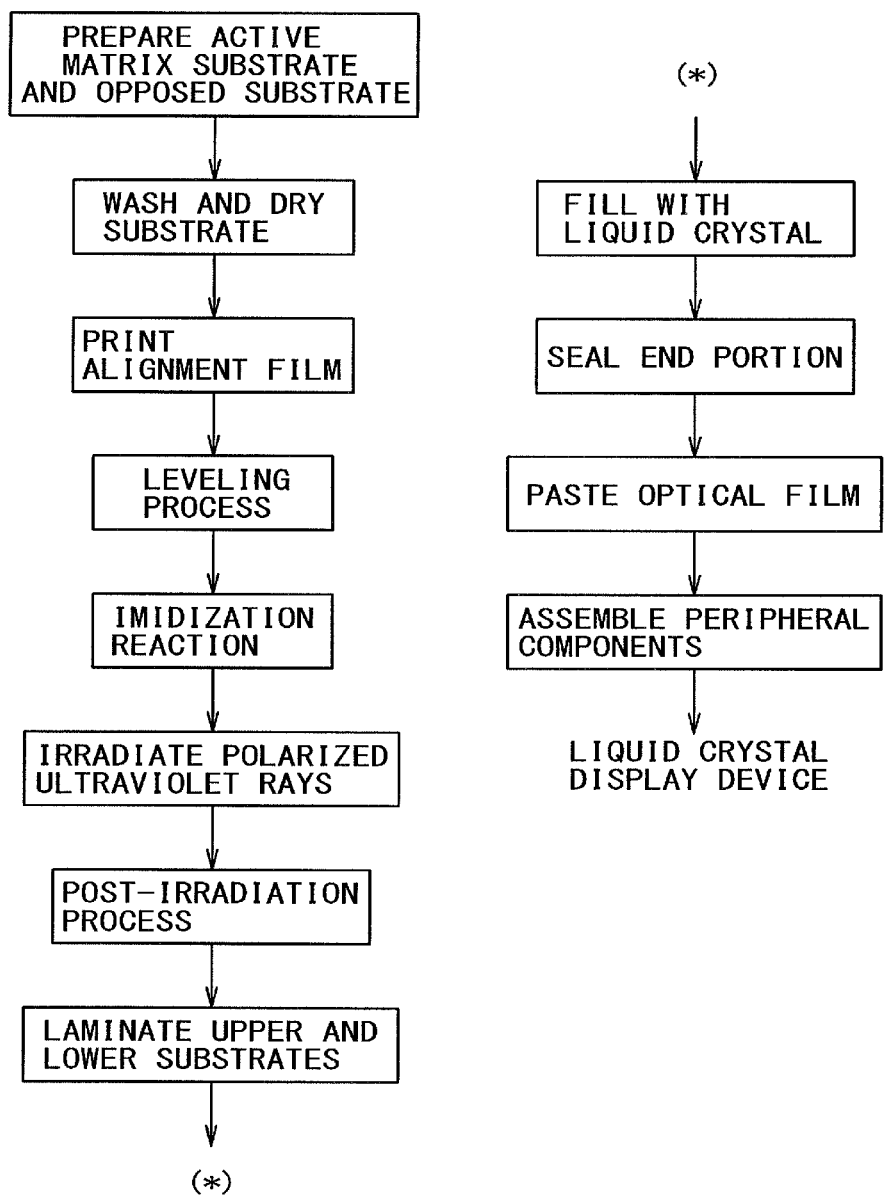
FIG. 8 is a flowchart of manufacturing steps of the liquid crystal display device using the alignment film according to the embodiment of the present invention.

In order to manufacture these liquid crystal display devices, various alignment film materials, alignment processing methods, and various liquid crystal materials already used for the liquid crystal display device can be used, and can be applied to various processes performed when assembling and processing the liquid crystal display device. An example thereof is shown in FIG. 8. First, an active matrix substrate and an opposed substrate are prepared through manufacturing processes, and the surface of an underlayer forming an alignment film is cleaned using various surface processing methods such as a UV/ozone method, an excimer UV method, and an oxygen plasma method. Next, the precursor of the alignment film is applied using various printing methods such as screen printing, flexographic printing, and ink-jet printing, and a leveling process is performed to have a uniform film thickness under a predetermined condition. Then, for example, the film is heated at a temperature of 180° C. or higher, and polyamide as the precursor is put to imidation reaction to polyimide. Further, polarized ultraviolet rays are irradiated and a proper post-process is performed using desired means, so that an alignment restraining force is generated on the surface of the polyimide alignment film (photo-alignment). At the stage of the irradiation of the polarized ultraviolet rays or the process after the irradiation, heating or irradiation of light with another wavelength can be performed. Further, at the stage before or after the irradiation of the polarized ultraviolet rays, the above-described procedure of the exposure to the oxidation atmosphere is added, so that the photo-alignment film whose surface has a high ratio of oxygen atoms is formed in a state where hydrophobicity is maintained. The active matrix substrate with the alignment film thus formed and the opposed substrate are pasted together while keeping a certain gap, so that the direction of the alignment restraining force is oriented in a desired direction. After a predetermined period of time, a portion in the gap is filled with liquid crystal, and an end portion of the substrate is sealed, so that a liquid crystal panel is completed. Then, optical films such as a polarizing plate and a retardation film are pasted to the panel, and a driving circuit, a backlight, and the like are attached, so that the liquid crystal display device can be obtained. It should be noted that the both of the alignment film formed on the active matrix substrate (TFT substrate) and the alignment film formed on the opposed substrate (CF substrate) are exposed to an oxidation atmosphere in the above-described description. However, even if any one of them is exposed to an oxidation atmosphere, improved effects for afterimage characteristics can be obtained. It is obvious that the afterimage characteristics can be further improved by performing the oxidation process for the both.

Next, the anchoring force of liquid crystal representing the magnitude of the alignment restraining force can be measured by the following method. Specifically, a pair of two glass substrates is coated with the alignment films to perform a photo-alignment process, and spacers having an appropriate thickness d are provided between the substrates, so that the alignment directions of the two alignment films are made parallel to each other. Accordingly, homogeneous alignment liquid crystal cells for evaluation can be produced. Each cell is sealed with a nematic liquid crystal material (helix pitch p and elastic constant $K_2$) with a chiral agent whose material physical property is already known, and the cells for evaluation are once held in the liquid crystal isotropic phase in order to stabilize the alignment. Then, the temperature is returned to a room temperature to measure a twist angle $\varnothing_2$ using the following method.

Next, most liquid crystal in each cell is removed by air pressure or the centrifugal force, and the inside of each cell is washed by solvent and dried. Then, each cell is sealed with the same liquid crystal without a chiral agent, and the alignment is similarly stabilized to measure a twist angle $\varnothing_1$. In this case, the anchoring intensity can be obtained by the following equation.

$$A_\phi = \frac{2K_2(2\pi d/p - \phi_2)}{d\sin(\phi_2 - \phi_1)} \quad \text{[Equation 1]}$$

Figure 7:
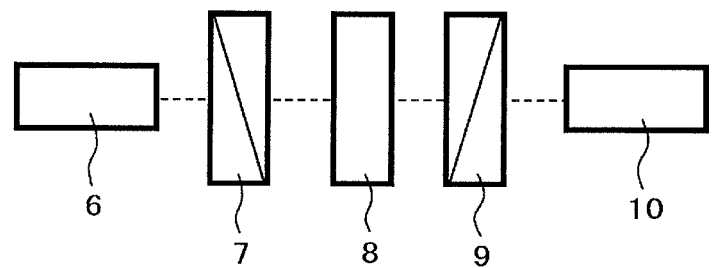
FIG. 7 is a schematic view of an optical system for anchoring measurement studied in the embodiment of the present invention.

Further, the twist angle was measured using an optical system as shown in FIG. 7. Specifically, a visible light source 6 and a photomultiplier tube 10 are collimated on the same straight line, and a polarizer 7, a cell for evaluation 8, and an analyzer 9 are arranged therebetween in this order. A tungsten lamp is used for the visible light source 6. First, the transmission axis of the polarizer 7 and the absorption axis of the analyzer 9 are set so as to be substantially parallel to the alignment direction (L-L') of the alignment film of the cell for evaluation 8. Next, only the polarizer is rotated, and the angle is changed so that the intensity of transmitted light is minimized. Next, only the analyzer is rotated, and the angle is changed so that the intensity of transmitted light is minimized. Thereafter, the rotation of only the polarizer and the rotation of only the analyzer are repeated as similar to the above until the angle is uniformed. The transmission axis rotational angle $\varnothing_{polarizer}$ of the polarizer and the absorption axis rotational angle $\varnothing_{analyzer}$ of the analyzer at the time of being finally converged are defined as "twist angle $\varnothing = \varnothing_{analyzer} - \varnothing_{polarizer}$. In this case, a read error in the measurement can be reduced by adjusting the refractive index anisotropy $\Delta n$ of liquid crystal to be used and the thickness d of the liquid crystal cell.

Next, a method of determining a brightness relaxation constant will be described below. In accordance with the procedure as described above in detail, various liquid crystal display devices including the alignment films are produced. A black/white window pattern is continuously displayed on the liquid crystal display device for a predetermined period of time (this is referred to as a printing time), and is immediately switched to the display voltage of the grey level as gradation on the entire screen to measure the time when the window pattern (referred to as printing or afterimage) disappears.

Ideally, no residual electric charge is generated in any part of the liquid crystal display device and the direction of the alignment restraining force is not disturbed in the alignment film. Thus, immediately after being switched to the display voltage, the grey level is displayed on the entire screen. However, the effective alignment state of a bright area (white pattern portion) becomes different from an ideal level due to the generation of the residual electric charge along with the driving and the disturbance of the direction of the alignment restraining force, and thus the brightness is differently viewed. Holding the display for a much longer time at the voltage of the gradation display results in the residual electric charge and the direction of the alignment restraining force at the voltage, and thus the display can be uniformly viewed. The in-plane brightness distribution of the liquid crystal display element was measured using a CCD camera, and the brightness relaxation constant of the liquid crystal display element was obtained at the printing time that was a time until the display was uniformly viewed. It should be noted that if the brightness was not relaxed after 480 hours, the evaluation was terminated to be described as ≥480.

Hereinafter, the present invention will be described in more details using embodiments. However, the technical scope of the present invention is not limited to the following embodiments.

First Embodiment

First, a liquid crystal display device which had a layer with the ratio of elements configuring an alignment film changed towards the film thickness direction on the surface of the alignment film and in which the ratio of oxygen atoms on the surface of the alignment film was higher than that in the alignment film was produced, and results obtained by comparing anchoring characteristics and afterimage characteristics with each other will be described using the drawings and tables.

Three kinds of substrates such as an alkali-free glass (AN-100 of ASAHI GLASS CO., LTD.) substrate, a substrate on which a tin-doped indium oxide (ITO) thin-film was formed by sputtering, and a substrate on which a silicon nitride (SiNx) thin-film was formed were used. Each of the base substrates thus prepared was washed by a chemical such as a neutral detergent, and then each surface was cleaned by a UV/$O_3$ process before the precursor of the alignment film was applied. The followings were used as alignment films for tests. As the component of a first alignment film, the chemical structure such as (Chemical formula 3) was selected for the framework of polyamide acid as the precursor of polyimide of (Chemical formula 2).

[Chemical formula 3]

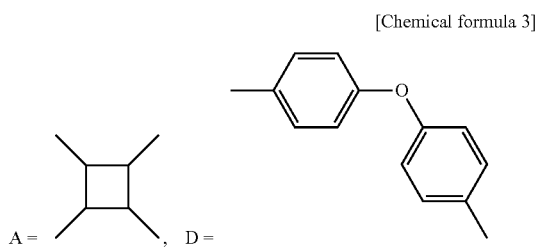

In accordance with an existing chemical synthetic method, polyamide acid was synthesized using dianhydride and diamine as raw materials. Further, as the component of a second alignment film, (Chemical formula 4) was selected.

[Chemical formula 4]

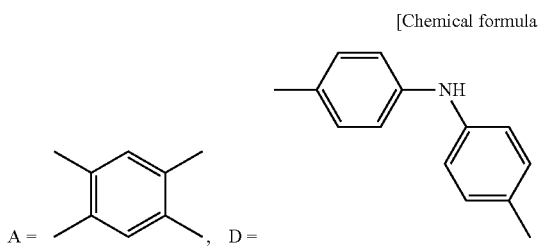

The molecular weights of polyamide acid were obtained using the molecular weights in terms of polystyrene by a GPC (gel permeation chromatograph analysis), and were 16000 and 14000. The first alignment film and the second alignment film were dissolved at a ratio of 1 to 1 in a mixed solvent of butyl cellosolve, N-methylpyrrolidone, and γ-butyrolactone. The resultants were formed on predetermined base substrates by flexo printing to obtain thin films, and the thin films were temporarily dried at a temperature of 40° C. or higher, followed by imidization in a bake furnace at a temperature of 150° C. or higher. The conditions of forming the thin films were adjusted in advance so that the film thickness in this case became approximately 100 nm. Next, in order to provide a liquid crystal alignment restraining force by cutting a part of the molecular framework of a highly-polymerized compound with polarized light, polarized ultraviolet rays (dominant wavelength of 280 nm) were collected and irradiated using an ultraviolet ray lamp (low-pressure mercury lamp), a wire grid polarizer, and an interference filter. In this case, one film which was photo-aligned while ozone gas generated around the ultraviolet ray lamp was forcibly blown, and the other film which was obtained by normally irradiating only ultraviolet rays were produced. After a predetermined period of time, foreign substances on the surfaces were removed by washing by pure water and drying by heating to produce alignment film specimens. Further, the elemental compositions of the obtained alignment films were measured by an XPS method. As an X-ray photoemission spectroscopy device, AXIS-HS of Shimadzu Corporation/Kratos was used. The measurement conditions were as follows: X-ray source monochrome Al (tube voltage of 15 kV and tube current of 15 mA), lens condition Hybrid (analysis area of 600×1000 μm), resolution Pass Energy 40, and scanning speed of 20 eV/min (0.1 eV step). The elemental composition from the surface to the depth direction was analyzed by sputtering using $Ar^+$ ion. The evaluation results are shown in Table 1.

TABLE 1

| z (nm) | C (%) | N (%) | O (%) |
|---|---|---|---|
| (a) | | | |
| 0 | 68.8 | 6.8 | 24.4 |
| 10 | 74.0 | 7.6 | 18.4 |
| 20 | 73.1 | 7.1 | 19.8 |
| 30 | 74.2 | 7.2 | 18.6 |
| 40 | 73.2 | 7.7 | 19.1 |
| 50 | 74.8 | 8.5 | 16.7 |
| 60 | 75.4 | 10.1 | 14.5 |
| 70 | 76.2 | 10.4 | 13.4 |
| 80 | 76.1 | 10.0 | 13.9 |
| 90 | 75.9 | 10.4 | 13.7 |
| 100 | 76.7 | 10.2 | 13.1 |
| (b) | | | |
| 0 | 74.9 | 7.5 | 17.6 |
| 10 | 74.2 | 7.5 | 18.3 |
| 20 | 73.5 | 7.1 | 19.4 |
| 30 | 74.1 | 7.1 | 18.8 |
| 40 | 74.1 | 7.5 | 18.4 |
| 50 | 75.3 | 8.5 | 16.2 |
| 60 | 75.9 | 10.7 | 13.4 |
| 70 | 75.4 | 10.3 | 14.3 |
| 80 | 75.9 | 10.7 | 13.4 |
| 90 | 75.9 | 10.0 | 14.1 |
| 100 | 76.4 | 10.0 | 13.6 |

Table 1 shows changes in the depth direction (z-direction) of the elemental compositions of the obtained films. In this case, the results for the one film to which ozone gas was blown were shown in Table 1(a), and the results for the other film to which no ozone gas was blown were shown in Table 1(b). In the case of the film to which no ozone gas was blown, the composition ratio of elements configuring the alignment film in terms of carbon C, nitrogen N, and oxygen O was as follows: C=74 to 75%, N=7%, and O=17 to 19% when z=0 to 40 nm; and C=75 to 76%, N=10%, and O=13 to 14% when z=60 to 100 nm. In this case, in the case of the first alignment film alone, C=74.1%, N=7.4%, and O=18.5%. In the case of the second alignment film alone, C=75.6%, N=10.3%, and O=13.8%. The first alignment film and the second alignment film were separated into two layers at a mixture ratio of 1 to 1 in the film thickness direction. On the contrary, in the case of the film to which ozone gas was blown, the composition ratio was as follows: C=69%, N=7%, and O=24% when z=0 nm; C=73 to 74%, N=7%, and O=18 to 19% when z=10 to 40 nm; and C=75 to 76%, N=10%, and O=13 to 14% when z=60 to 100 nm. The results show that the ratio of oxygen O was increased only on the outermost layer whereas the ratio of carbon C was relatively decreased. It can be understood that the ratio of oxygen on the outermost layer was increased by about 26% ((24−19)÷19=0.26) relative to the first alignment film as compared to the inside of the film. It should be noted that the both films were hydrophobic irrespective of blowing of ozone.

The anchoring energy was measured using each of the alignment films. The anchoring energy of the film to which no ozone was blown was 2.0 mJ/m$^2$ where as that of the film to which ozone was blown was 2.4 mJ/m$^2$. Thus, the anchoring characteristic was improved.

Further, an IPS liquid crystal display device was produced using each of the alignment films to measure the brightness relaxation constant. The brightness relaxation constant of the film to which no ozone was blown was 54 hours whereas that of the film to which ozone was blown was 42 hours. Thus, the brightness relaxation constant was improved.

As described above, if the liquid crystal display device which had a layer with the ratio of elements configuring the alignment film changed towards the film thickness direction on the surface of the alignment film and in which the ratio of oxygen atoms on the surface of the alignment film was higher than that in the alignment film was produced using ozone gas when the photo-alignment process was performed, it was found that the anchoring characteristics and afterimage characteristics were improved.

According to the embodiment, even in the case of using the photo-alignment technique, it is possible to provide a liquid crystal display device and a manufacturing method thereof in which excellent afterimage characteristics can be stably obtained.

Second Embodiment

Next, a liquid crystal display device which had a layer with the ratio of elements configuring an alignment film changed towards the film thickness direction on the surface of the alignment film and in which the ratio of oxygen atoms on the surface of the alignment film was higher than that in the alignment film was produced under different producing conditions, and results obtained by comparing anchoring characteristics and afterimage characteristics with each other will be described using the drawings and tables.

As the material of the alignment films, the same material as Embodiment 1 was used. Under the same producing conditions, the substrates were coated with the alignment films, and were burned for imidization. Then, using the same polarized ultraviolet ray source, the alignment process was performed without blowing ozone gas. After a predetermined period of time, foreign substances on the surfaces were removed by washing by pure water and drying by heating (these processes were the same as those for the alignment films shown as the comparison of Embodiment 1). The thin films were dipped into hydrogen peroxide water (3%) for one minute, and foreign substances on the surfaces were removed by washing by pure water and drying by heating again to produce alignment film specimens. The evaluation results are shown in Table 2.

TABLE 2

| z (nm) | C (%) | N (%) | O (%) |
|---|---|---|---|
| 0 | 69.1 | 7.2 | 23.7 |
| 10 | 71.2 | 7.2 | 21.6 |
| 20 | 72.9 | 7.2 | 19.9 |
| 30 | 72.9 | 7.3 | 19.8 |
| 40 | 73.9 | 7.3 | 18.8 |
| 50 | 75.4 | 8.5 | 16.1 |
| 60 | 75.3 | 10.3 | 14.4 |
| 70 | 76.7 | 10.2 | 13.1 |
| 80 | 76.1 | 10.6 | 13.3 |
| 90 | 75.5 | 10.8 | 13.7 |
| 100 | 75.6 | 10.8 | 13.6 |

Table 2 shows changes in the depth direction (z-direction) of the elemental compositions of the obtained films. In the case of the film for which such processes were performed, the composition ratio of elements configuring the alignment film in terms of carbon C, nitrogen N, and oxygen O was as follows: C=69%, N=7%, and O=24% when z=0 nm; and C=71%, N=7%, and O=22% when z=10 nm. However, C=73 to 74%, N=7%, and O=18 to 19% when z=20 to 40 nm, and C=75 to 76%, N=10%, and O=13 to 14% when z=60 to 100 nm. The results show that the ratio of oxygen O was increased only at an area near the outermost layer whereas the ratio of carbon C was relatively decreased. It can be understood that the ratio of oxygen on the outermost layer was increased by about 26% ((24−19)÷19=0.26) relative to the first alignment film as compared to the inside of the film. It should be noted that the alignment films produced in the embodiment exhibited hydrophobicity.

The anchoring energy was measured using each of the alignment films. The anchoring energy of the film for comparison was 2.0 $mJ/m^2$ where as that processed with hydrogen peroxide water was 2.7 $mJ/m^2$. Thus, the anchoring characteristic was improved.

Further, an IPS liquid crystal display device was produced using each of the alignment films to measure the brightness relaxation constant. The brightness relaxation constant of the film for comparison was 54 hours whereas that processed with hydrogen peroxide water was 36 hours. Thus, the brightness relaxation constant was improved.

As described above, if the liquid crystal display device which had a layer with the ratio of elements configuring the alignment film changed towards the film thickness direction on the surface of the alignment film and in which the ratio of oxygen atoms on the surface of the alignment film was higher than that in the alignment film was produced by an oxidation process using hydrogen peroxide water after the photo-alignment process was performed, it was found that the anchoring characteristics and afterimage characteristics were improved.

According to the embodiment, even in the case of using the photo-alignment technique, it is possible to provide a liquid crystal display device and a manufacturing method thereof in which excellent afterimage characteristics can be stably obtained.

Third Embodiment

Next, a liquid crystal display device which had a layer with the ratio of elements configuring an alignment film changed towards the film thickness direction on the surface of the alignment film and in which the ratio of oxygen atoms on the surface of the alignment film was higher than that in the alignment film was produced under different producing conditions, and results obtained by comparing anchoring characteristics and afterimage characteristics with each other will be described using the drawings and tables.

As the material of the alignment films, the same material as Embodiment 1 was used. Under the same producing conditions, the substrates were coated with the alignment films, and were burned for imidization. Then, using the same polarized ultraviolet ray source, the alignment process was performed without blowing ozone gas. After a predetermined period of time, foreign substances on the surfaces were removed by washing by pure water and drying by heating (these processes were the same as those for the alignment films shown as the comparison of Embodiment 1). The thin films were dipped into ozone water (1 ppm) for one minute, and foreign substances on the surfaces were removed by washing by pure water and drying by heating again to produce alignment film specimens. The evaluation results are shown in Table 3.

TABLE 3

| z (nm) | C (%) | N (%) | O (%) |
|---|---|---|---|
| 0 | 68.4 | 7.2 | 24.4 |
| 10 | 69.8 | 7.1 | 23.1 |
| 20 | 71.2 | 6.9 | 21.9 |

TABLE 3-continued

| z (nm) | C (%) | N (%) | O (%) |
|---|---|---|---|
| 30 | 71.9 | 7.4 | 20.7 |
| 40 | 72.5 | 7.4 | 20.1 |
| 50 | 74.7 | 9.0 | 16.3 |
| 60 | 75.6 | 10.3 | 14.1 |
| 70 | 76.1 | 10.1 | 13.8 |
| 80 | 76.2 | 10.3 | 13.5 |
| 90 | 75.9 | 9.9 | 14.2 |
| 100 | 75.9 | 10.1 | 14.0 |

Table 3 shows changes in the depth direction (z-direction) of the elemental compositions of the obtained films. In the case of the film for which such processes were performed, the composition ratio of elements configuring the alignment film in terms of carbon C, nitrogen N, and oxygen O was as follows: C=68%, N=7%, and O=24% when z=0 nm; C=70 to 73%, N=7%, and O=23 to 20% when z=10 to 40 nm; and C=75 to 76%, N=10%, and O=13 to 14% when z=60 to 100 nm. The results show that the ratio of oxygen O was increased only at an area near the outermost layer whereas the ratio of carbon C was relatively decreased. It should be noted that the alignment films produced in the embodiment exhibited hydrophobicity.

The anchoring energy was measured using each of the alignment films. The anchoring energy of the film for comparison was 2.0 mJ/m$^2$ where as that processed with ozone water was 3.0 mJ/m$^2$. Thus, the anchoring characteristic was improved.

Further, an IPS liquid crystal display device was produced using each of the alignment films to measure the brightness relaxation constant. The brightness relaxation constant of the film for comparison was 54 hours whereas that processed with ozone water was 30 hours. Thus, the brightness relaxation constant was improved.

As described above, if the liquid crystal display device which had a layer with the ratio of elements configuring the alignment film changed towards the film thickness direction on the surface of the alignment film and in which the ratio of oxygen atoms on the surface of the alignment film was higher than that in the alignment film was produced by an oxidation process using ozone water after the photo-alignment process was performed, it was found that the anchoring characteristics and afterimage characteristics were improved.

According to the embodiment, even in the case of using the photo-alignment technique, it is possible to provide a liquid crystal display device and a manufacturing method thereof in which excellent afterimage characteristics can be stably obtained.

Fourth Embodiment

Next, a liquid crystal display device which had a layer with the ratio of elements configuring an alignment film changed towards the film thickness direction on the surface of the alignment film and in which the ratio of oxygen atoms on the surface of the alignment film was higher than that in the alignment film was produced under different producing conditions, and results obtained by comparing anchoring characteristics and afterimage characteristics with each other will be described using the drawings and tables.

As the material of the alignment films, the same material as Embodiment 1 was used. Under the same producing conditions, the substrates were coated with the alignment films, and were burned for imidization. Then, using the same polarized ultraviolet ray source, the alignment process was performed without blowing ozone gas. After a predetermined period of time, foreign substances on the surfaces were removed by washing by pure water and drying by heating (these processes were the same as those for the alignment films shown as the comparison of Embodiment 1). The thin films were dipped into hypochlorous water (20 ppm) for 30 seconds, and foreign substances on the surfaces were removed by washing by pure water and drying by heating again to produce alignment film specimens. The evaluation results are shown in Table 4.

TABLE 4

| z (nm) | C (%) | N (%) | O (%) |
|---|---|---|---|
| 0 | 68.2 | 6.5 | 25.3 |
| 10 | 68.5 | 7.2 | 24.3 |
| 20 | 69.9 | 6.7 | 23.4 |
| 30 | 68.8 | 6.7 | 24.5 |
| 40 | 70.0 | 6.8 | 23.2 |
| 50 | 74.7 | 9.0 | 16.3 |
| 60 | 75.7 | 10.6 | 13.7 |
| 70 | 76.2 | 10.3 | 13.5 |
| 80 | 75.7 | 10.0 | 14.3 |
| 90 | 76.4 | 10.3 | 13.3 |
| 100 | 76.0 | 10.2 | 13.8 |

Table 4 shows changes in the depth direction (z-direction) of the elemental compositions of the obtained films. In the case of the film for which such processes were performed, the composition ratio of elements configuring the alignment film in terms of carbon C, nitrogen N, and oxygen O was as follows: C=68%, N=7%, and O=25% when z=0 nm; C=68 to 70%, N=7%, and O=24 to 23% when z=10 to 40 nm; and O=75 to 76%, N=10%, and O=13 to 14% when z=60 to 100 nm. The results show that the ratio of oxygen O was increased only at an area near the outermost layer whereas the ratio of carbon C was relatively decreased. It should be noted that the alignment films produced in the embodiment exhibited hydrophobicity.

The anchoring energy was measured using each of the alignment films. The anchoring energy of the film for comparison was 2.0 mJ/m$^2$ where as that processed with hypochlorous water was 3.5 mJ/m$^2$. Thus, the anchoring characteristic was improved.

Further, an IPS liquid crystal display device was produced using each of the alignment films to measure the brightness relaxation constant. The brightness relaxation constant of the film for comparison was 54 hours whereas that processed with hypochlorous water was 31 hours. Thus, the brightness relaxation constant was improved.

As described above, if the liquid crystal display device which had a layer with the ratio of elements configuring the alignment film changed towards the film thickness direction on the surface of the alignment film and in which the ratio of oxygen atoms on the surface of the alignment film was higher than that in the alignment film was produced by an oxidation process using hypochlorous water after the photo-alignment process was performed, it was found that the anchoring characteristics and afterimage characteristics were improved.

According to the embodiment, even in the case of using the photo-alignment technique, it is possible to provide a liquid crystal display device and a manufacturing method thereof in which excellent afterimage characteristics can be stably obtained.

Fifth Embodiment

Next, results obtained when the state of the oxidation process was changed by changing the surface treatment time of the alignment films using the method shown in Embodiment 1 will be described using the drawings and tables.

As the material of the alignment films, the same material as Embodiment 1 was used. Under the same producing conditions, the substrates were coated with the alignment films, and were burned for imidization. Then, using the same polarized ultraviolet ray source, the alignment process was performed by blowing ozone gas. After predetermined irradiation was completed, only ultraviolet rays were shut by a shutter, and only ozone gas was continued to expose to make longer the oxidation time for the surfaces of the alignment films. The processes thereafter were the same as those of Embodiment 1, and the oxygen concentration on the surfaces of the alignment films and the contact angle relative to water were measured. Further, the liquid crystal display device was similarly assembled, and the brightness relaxation constant was measured. The results were shown in Table 5.

TABLE 5

| SURFACE TREATMENT CONDITION | | OUTERMOST LAYER O(%) | CONTACT ANGLE OF WATER (DEGREE) | BRIGHTNESS RELAXATION (TIME) |
|---|---|---|---|---|
| INITIAL STAGE | | 17.6 | 56 | 54 |
| OZONE | 0 | 24.4 | 53 | 42 |
| GAS | 5 | 24.9 | 49 | 35 |
| PROCESSING | 10 | 25.3 | 46 | 26 |
| TIME AFTER | 15 | 25.8 | 43 | 25 |
| UV | 20 | 26.4 | 40 | 33 |
| (MINUTE) | 25 | 26.8 | 38 | 41 |
| | 30 | 27.2 | 35 | 48 |

In this case, the surface treatment condition described as the initial stage shows an alignment film when polarized ultraviolet rays were irradiated without blowing ozone gas. The results show that the ratio of oxygen atoms on the outermost layer was increased from 17.6% in the initial stage to 24.4%, which was the same as the results shown in Embodiment 1. However, it can be understood that if ozone gas was continued to be blown even after the polarized ultraviolet rays were irradiated, the ratio of oxygen atoms on the outermost layer was continued to be increased with time. Further, in the case of the contact angle relative to water, the contact angle of 56 degrees in the initial stage was decreased as the blowing time of ozone gas became longer, and was decreased to 35 degrees by 20 degrees or more in 30 minutes. On the other hand, the brightness relaxation constant was gradually decreased from 54 hours in the initial stage. However, the brightness relaxation time became longer as the processing time became longer after a minimum value of 25 hours in a processing time of 15 minutes. It was found that even if the brightness relaxation constant was improved by increasing the ratio of oxygen atoms on the surface of the photo-alignment film, the brightness relaxation constant was deteriorated if the ratio of oxygen atoms was extremely increased, and the contact angle within the effective processing time ranged to 14 degrees or smaller from the initial stage. Thus, as the hydrophobic scale of the alignment film, it is advantageous that the contact angle of water is 38 degrees or more. Further, 40 degrees or more is desirable, and 43 degrees or more is more desirable.

When the anchoring energy and brightness relaxation constant were evaluated in each process of Embodiments 1 to 3 so that the contact angle of water on the surface of the alignment film became 43 degrees, excellent results could be obtained. Further, as a result of applying the alignment film to the liquid crystal display device, excellent afterimage characteristics could be obtained.

As described above, if the liquid crystal display device which had a layer with the ratio of elements configuring the alignment film changed towards the film thickness direction on the surface of the alignment film and in which the ratio of oxygen atoms on the surface of the alignment film was higher than that in the alignment film was produced by adding an oxidation process using ozone gas after the photo-alignment process was performed, it was found that the anchoring characteristics and afterimage characteristics were improved, but excessive oxidation adversely deteriorated the display performance of the liquid crystal display device.

According to the embodiment, even in the case of using the photo-alignment technique, it is possible to provide a liquid crystal display device and a manufacturing method thereof in which excellent afterimage characteristics can be stably obtained. It should be noted that it is advantageous that the contact angle of water on the alignment film as the hydrophobic scale is 38 degrees or more.

It should be noted that the present invention is not limited to the above-described embodiments, but various modified embodiments may be included. For example, the above-described embodiments have been described in detail to understandably explain the present invention, and are not necessarily limited to those having the all configurations described above. Further, a part of the configuration in one embodiment can be replaced by a configuration of another embodiment, and the configuration in one embodiment can be added to another embodiment. In addition, a part of the configuration in each embodiment can be added to or replaced by another, or deleted.

What is claimed is:
1. A liquid crystal display device comprising:
a thin-film transistor (TFT) substrate which includes a base substrate, pixel electrodes and TFTs, and on which an alignment film is formed on a pixel; and
an opposed substrate which is arranged to face the TFT substrate,
wherein liquid crystal molecules are sandwiched between the alignment film of the TFT substrate and that of the opposed substrate, the alignment film is a polyimide material that can provide a liquid crystal alignment restraining force by irradiating polarized light,
the polyimide material is made from a polyamide acid precursor or a polyamide acid ester precursor,
the liquid crystal molecules are aligned in parallel with a surface of the base substrate,
the alignment film includes a first layer and a second layer,
a ratio of oxygen atoms on a surface of the first layer that is at an interface with the liquid crystal molecules is higher than a ratio of oxygen atoms at an interface between the first layer and the second layer,
wherein the ratio of oxygen atoms of the first layer is gradually decreased from the surface of the first layer towards the inside of the alignment film in an alignment film thickness direction,
the ratio of oxygen atoms at a position with the highest oxygen concentration in the first layer is 25% or higher than at a position with the lowest oxygen concentration in the alignment film, and
the alignment film is a photodegradation-type photo-alignment film including polyimide of (Chemical formula 1), and

(Chemical formula 1)

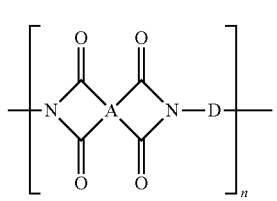

in which the inside of the parentheses [ ] represents a chemical structure of a repeating unit, the index n represents a number of a repeating unit, N represents nitrogen atoms, O represents oxygen atoms, A represents a quadrivalent organic group including a cyclobutane ring, D represents a divalent organic group, and n is an integer of one or greater than one.

2. The liquid crystal display device according to claim 1, wherein the ratio of oxygen atoms at a position with the highest oxygen concentration in the first layer is 25% or higher than at a position with the lowest oxygen concentration in the first layer of the alignment film.

3. The liquid crystal display device according to claim 1, wherein the thickness of the first layer is smaller than the entire thickness of the alignment film by 50% or less.

4. The liquid crystal display device according to claim 1, wherein a root-mean-square of a size of irregularities on the surface of the first layer of the alignment film is 1 nm or less.

5. The liquid crystal display device according to claim 1, wherein the first layer is a photo-alignment upper layer capable of photo-alignment and the second layer is smaller in resistivity than the photo-alignment upper layer.

6. The liquid crystal display device according to claim 1, wherein the liquid crystal display device is an In-plane switching (IPS) liquid crystal display device.

7. The liquid crystal display device according to claim 1, wherein a contact angle of water on the surface of the first layer of the alignment film is 38 degrees or more.

8. The liquid crystal display device according to claim 1, wherein a ratio of carbon atoms on the surface of the first layer of the alignment film is lower than that inside the alignment film.

9. The liquid crystal display device according to claim 1, wherein the A of the (Chemical formula 1) represents formula 2 and the D of the (Chemical formula 1) represents formula 4 or 5 formula 2

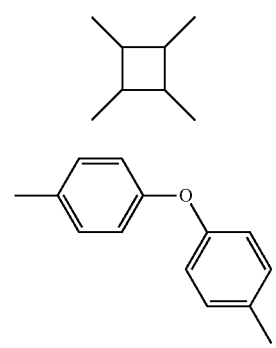

formula 4

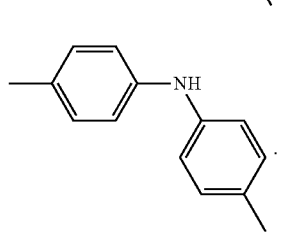

formula 5

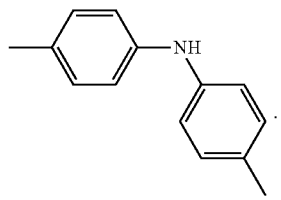

10. The liquid crystal display device according to claim 1, wherein the A of the (Chemical formula 1) represents formula 2 and the D of the (Chemical formula 1) represents formula 4 formula 2

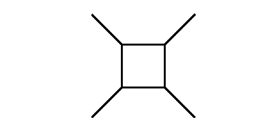

formula 4

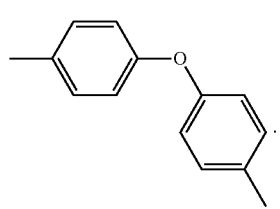

* * * * *